United States Patent
Chen et al.

(10) Patent No.: US 10,866,388 B2
(45) Date of Patent: Dec. 15, 2020

(54) LENS ASSEMBLY

(71) Applicants: Sintai Optical (Shenzhen) Co., Ltd., ShenZhen (CN); Asia Optical Co., Inc., Taichung (TW)

(72) Inventors: Bo-Yan Chen, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 155 days.

(21) Appl. No.: 16/163,609

(22) Filed: Oct. 18, 2018

(65) Prior Publication Data

US 2019/0162935 A1    May 30, 2019

(30) Foreign Application Priority Data

Nov. 30, 2017   (CN) .......................... 2017 1 1243961

(51) Int. Cl.
*G02B 9/64* (2006.01)
*G02B 13/00* (2006.01)

(52) U.S. Cl.
CPC .............. *G02B 9/64* (2013.01); *G02B 13/006* (2013.01); *G02B 13/0045* (2013.01)

(58) Field of Classification Search
CPC ........ G02B 9/62; G02B 9/64; G02B 13/0045; G02B 13/005; G02B 13/006; G02B 13/04
USPC .................................. 359/754–756, 761–762
See application file for complete search history.

(56) References Cited

U.S. PATENT DOCUMENTS

| | | | |
|---|---|---|---|
| 2014/0240848 A1* | 8/2014 | Toyama | G02B 15/17 359/688 |
| 2015/0378134 A1* | 12/2015 | Koga | G02B 13/008 359/356 |
| 2016/0109690 A1* | 4/2016 | Ogata | G02B 13/02 359/557 |
| 2016/0282592 A1* | 9/2016 | Abe | G02B 15/16 |
| 2017/0068075 A1* | 3/2017 | Onozaki | G02B 15/173 |
| 2017/0108675 A1* | 4/2017 | Ichikawa | G02B 9/64 |

* cited by examiner

*Primary Examiner* — Jordan M Schwartz
(74) *Attorney, Agent, or Firm* — McClure, Qualey & Rodack, LLP

(57) ABSTRACT

A lens assembly comprises sequentially from an object side to an image side along an optical axis a first lens, a second lens, a third lens, a fourth lens, a fifth lens, a sixth lens, and a seventh lens. The first lens is with negative refractive power and includes a convex surface facing the object side and a concave surface facing the image side. The second lens is with refractive power. The third lens is a biconvex lens with positive refractive power. The fourth lens is with refractive power and includes a convex surface facing the image side. The fifth lens is a biconvex lens with positive refractive power. The sixth lens is with negative refractive power and includes a concave surface facing the object side. The seventh lens is a meniscus lens with refractive power.

18 Claims, 8 Drawing Sheets

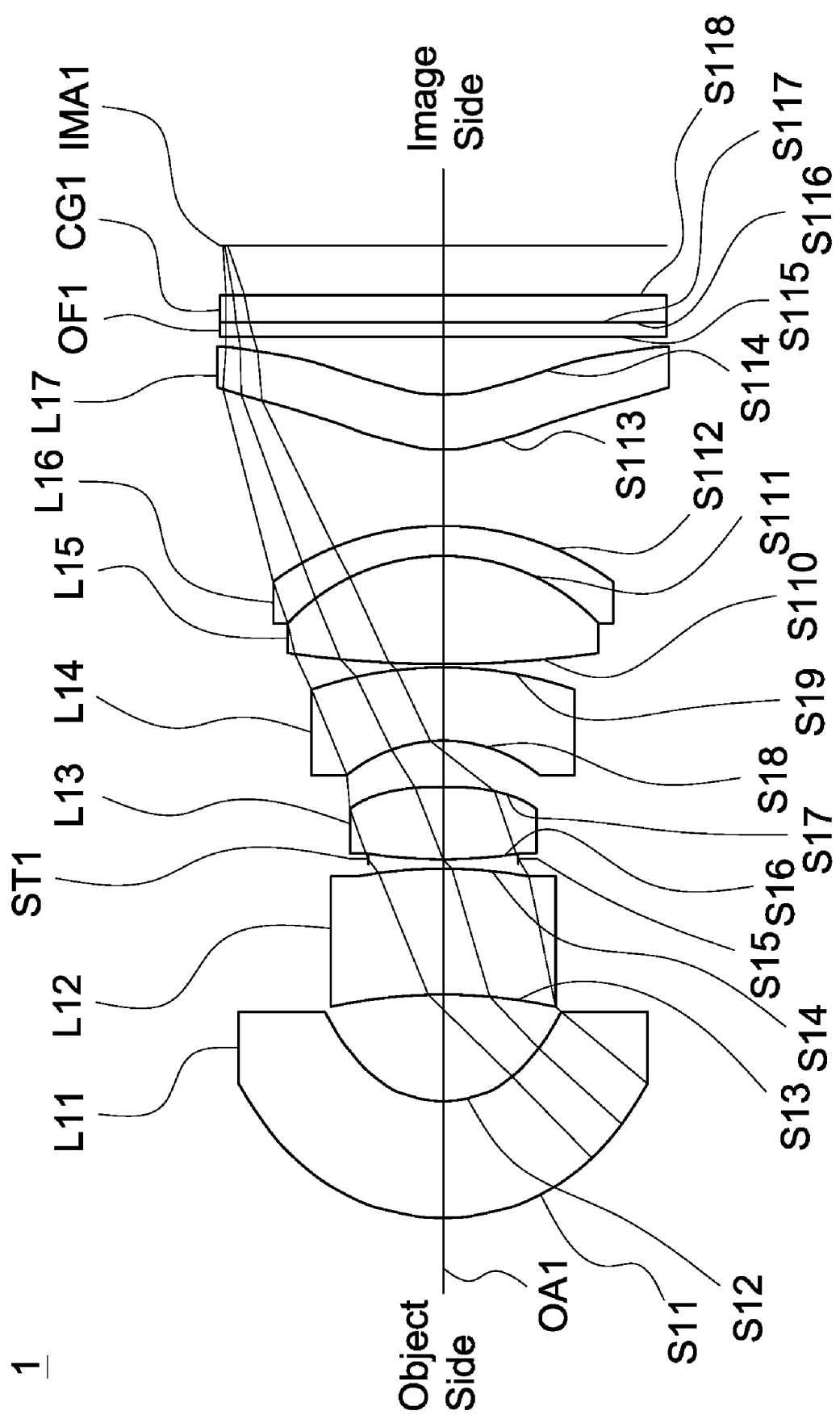

LENS ASSEMBLY

CROSS REFERENCE TO RELATED APPLICATIONS

This Application claims priority of China Patent Application No. 201711243961.5, filed on Nov. 30, 2017, the entirety of which is incorporated by reference herein.

BACKGROUND OF THE INVENTION

Field of the Invention

The invention relates to a lens assembly.

Description of the Related Art

The current development trend of a lens assembly is toward miniaturization and high resolution. Additionally, the lens assembly is developed to have resistance to environment temperature variation in accordance with different application requirements. However, the known lens assembly can't satisfy such requirements. Therefore, the lens assembly needs a new structure in order to meet the requirements of miniaturization, high resolution, and resistance to environment temperature variation at the same time.

BRIEF SUMMARY OF THE INVENTION

The invention provides a lens assembly to solve the above problems. The lens assembly of the invention is provided with characteristics of a shortened total lens length, a higher resolution, and a resistance to environment temperature variation, and still has a good optical performance.

The lens assembly in accordance with an exemplary embodiment of the invention includes a first lens, a second lens, a third lens, a fourth lens, a fifth lens, a sixth lens, and a seventh lens, wherein the first, second, third, fourth, fifth, sixth, and seventh lenses are arranged in order from an object side to an image side along an optical axis. The first lens is with negative refractive power and includes a convex surface facing the object side and a concave surface facing the image side. The second lens is with refractive power. The third lens is a biconvex lens with positive refractive power. The fourth lens is with refractive power and includes a convex surface facing the image side. The fifth lens is a biconvex lens with positive refractive power. The sixth lens is with negative refractive power and includes a concave surface facing the object side. The seventh lens is a meniscus lens with refractive power.

In another exemplary embodiment, the second lens is with positive refractive power and further includes a concave surface facing the object side and a convex surface facing the image side, the fourth lens is with negative refractive power and further includes a concave surface facing the object side, and the seventh lens is with positive refractive power and further includes a concave surface facing the image side.

In yet another exemplary embodiment, the second lens is with negative refractive power and further includes a convex surface facing the object side and a concave surface facing the image side, the fourth lens is with positive refractive power and further includes a convex surface facing the object side, and the seventh lens is with positive refractive power and further includes a concave surface facing the object side.

In another exemplary embodiment, the lens assembly further includes an eighth lens disposed between the fifth lens and the image side, wherein the eighth lens is a meniscus lens.

In yet another exemplary embodiment, the eighth lens is with negative refractive power and includes a concave surface facing the object side and a convex surface facing the image side.

In another exemplary embodiment, the lens assembly satisfies:
$0 \text{ mm}^2 < f_1 \times f_6 < 215 \text{ mm}^2$, $-45 \text{ mm} < f_1 + f_6 < 0 \text{ mm}$, wherein $f_1$ is an effective focal length of the first lens and $f_6$ is an effective focal length of the sixth lens.

In yet another exemplary embodiment, the lens assembly satisfies: $20 \text{ mm}^2 < f_3 \times f_5 < 30 \text{ mm}^2$, $-95 \text{ mm}^2 < f_5 \times f_6 < 0 \text{ mm}^2$, wherein $f_3$ is an effective focal length of the third lens, $f_5$ is an effective focal length of the fifth lens, and $f_6$ is an effective focal length of the sixth lens.

In another exemplary embodiment, the lens assembly satisfies: $-15.5 \text{ mm} < f_6 - f_4 < -9.1 \text{ mm}$, wherein $f_4$ is an effective focal length of the fourth lens and $f_6$ is an effective focal length of the sixth lens.

In yet another exemplary embodiment, the lens assembly satisfies: $34 < Vd_5 - Vd_6 < 66$, $2.5 < Vd_5/Vd_6 < 4.5$, wherein $Vd_5$ is an Abbe number of the fifth lens and $Vd_6$ is an Abbe number of the sixth lens.

In another exemplary embodiment, the lens assembly further includes a stop disposed between the second lens and the fourth lens, wherein the fifth lens and the sixth lens are cemented.

The lens assembly in accordance with another exemplary embodiment of the invention includes a first lens, a second lens, a third lens, a fourth lens, a fifth lens, a sixth lens, and a seventh lens, wherein the first, second, third, fourth, fifth, sixth, and seventh lenses are arranged in order from an object side to an image side along an optical axis. The first lens is with negative refractive power and includes a convex surface facing the object side and a concave surface facing the image side. The second lens is with refractive power. The third lens is a biconvex lens with positive refractive power. The fourth lens is with refractive power and includes a convex surface facing the image side. The fifth lens is a biconvex lens with positive refractive power. The sixth lens is with negative refractive power and includes a concave surface facing the object side. The seventh lens is with positive refractive power and includes a convex surface facing the object side.

The lens assembly in accordance with another exemplary embodiment of the invention includes a first lens, a second lens, a third lens, a fourth lens, a fifth lens, a sixth lens, and a seventh lens, wherein the first, second, third, fourth, fifth, sixth, and seventh lenses are arranged in order from an object side to an image side along an optical axis. The first lens is with negative refractive power and includes a convex surface facing the object side and a concave surface facing the image side. The second lens is with refractive power. The third lens is a biconvex lens with positive refractive power. The fourth lens is with refractive power and includes a convex surface facing the image side. The fifth lens is a biconvex lens with positive refractive power. The sixth lens is with negative refractive power and includes a concave surface facing the object side. The seventh lens is with positive refractive power and includes a convex surface facing the object side. The lens assembly satisfies $34 < Vd_5 - Vd_6 < 66$, wherein $Vd_5$ is an Abbe number of the fifth lens and $Vd_6$ is an Abbe number of the sixth lens.

The lens assembly in accordance with another exemplary embodiment of the invention includes a first lens, a second lens, a third lens, a fourth lens, a fifth lens, a sixth lens, and a seventh lens, wherein the first, second, third, fourth, fifth, sixth, and seventh lenses are arranged in order from an object side to an image side along an optical axis. The first lens is with negative refractive power and includes a convex surface facing the object side and a concave surface facing the image side. The second lens is with refractive power. The third lens is a biconvex lens with positive refractive power. The fourth lens is with refractive power and includes a convex surface facing the image side. The fifth lens is a biconvex lens with positive refractive power. The sixth lens is with negative refractive power and includes a concave surface facing the object side. The seventh lens is with positive refractive power and includes a convex surface facing the object side. The lens assembly satisfies 20 mm$^2$<f$_3$×f$_5$<30 mm$^2$, wherein f$_3$ is an effective focal length of the third lens and f$_5$ is an effective focal length of the fifth lens.

The lens assembly in accordance with another exemplary embodiment of the invention includes a first lens, a second lens, a third lens, a fourth lens, a fifth lens, a sixth lens, and a seventh lens, wherein the first, second, third, fourth, fifth, sixth, and seventh lenses are arranged in order from an object side to an image side along an optical axis. The first lens is with negative refractive power and includes a convex surface facing the object side and a concave surface facing the image side. The second lens is with refractive power. The third lens is a biconvex lens with positive refractive power. The fourth lens is with refractive power and includes a convex surface facing the image side. The fifth lens is a biconvex lens with positive refractive power. The sixth lens is with negative refractive power and includes a concave surface facing the object side. The seventh lens is with positive refractive power and includes a convex surface facing the object side. The lens assembly satisfies 2.5<Vd$_5$/Vd$_6$<4.5, wherein Vd$_5$ is an Abbe number of the fifth lens and Vd$_6$ is an Abbe number of the sixth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 1 is a lens layout and optical path diagram of a lens assembly in accordance with a first embodiment of the invention;

DETAILED DESCRIPTION OF THE INVENTION

Figure 2A:
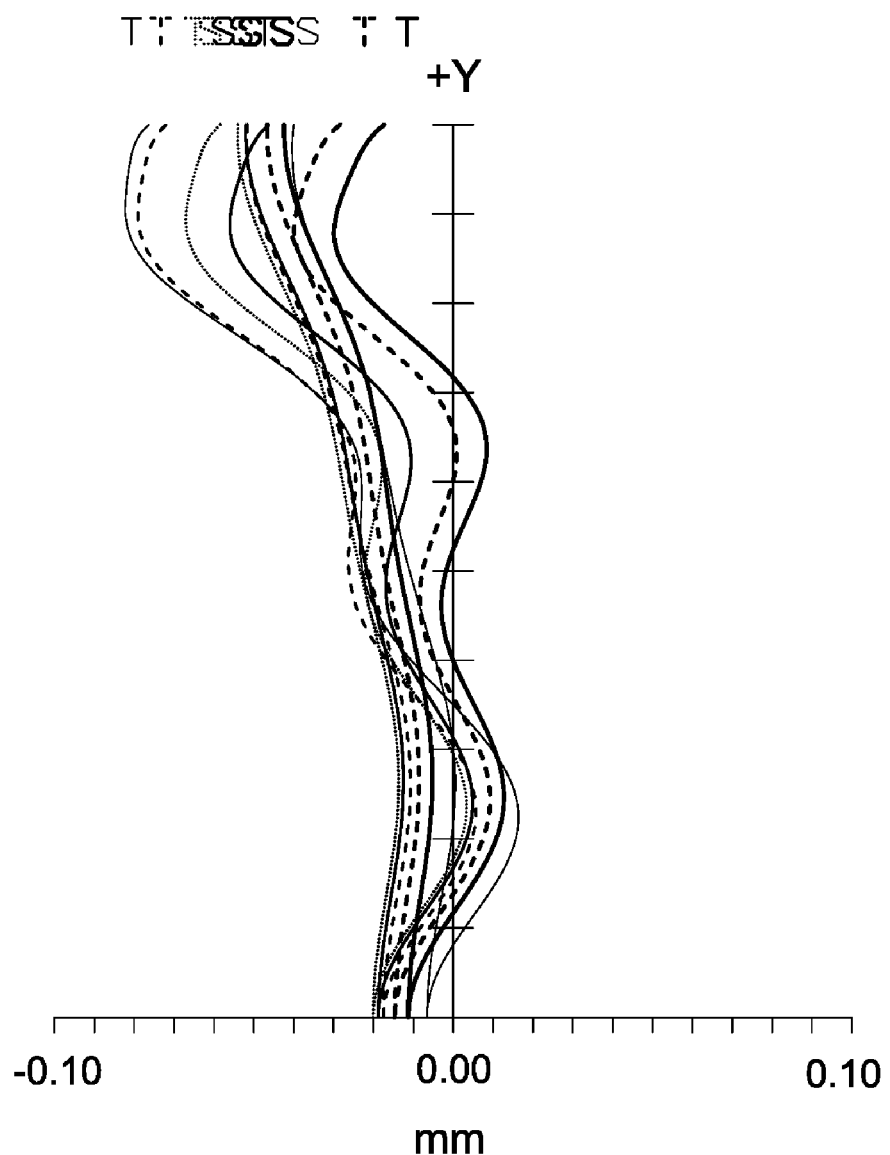
FIG. 2A depicts a field curvature diagram of the lens assembly in accordance with the first embodiment of the invention.

The following description is made for the purpose of illustrating the general principles of the invention and should not be taken in a limiting sense. The scope of the invention is best determined by reference to the appended claims.

Referring to FIG. 1, FIG. 1 is a lens layout and optical path diagram of a lens assembly in accordance with a first embodiment of the invention. The lens assembly 1 includes a first lens L11, a second lens L12, a stop ST1, a third lens L13, a fourth lens L14, a fifth lens L15, a sixth lens L16, a seventh lens L17, an optical filter OF1, and a cover glass CG1, all of which are arranged in order from an object side to an image side along an optical axis OA1. In operation, an image of light rays from the object side is formed at an image plane IMA1.

The first lens L11 is a meniscus lens with negative refractive power and made of glass material, wherein the object side surface S11 is a convex surface, the image side surface S12 is a concave surface, and both of the object side surface S11 and image side surface S12 are aspheric surfaces.

The second lens L12 is a meniscus lens with positive refractive power and made of glass material, wherein the object side surface S13 is a concave surface, the image side surface S14 is a convex surface, and both of the object side surface S13 and image side surface S14 are aspheric surfaces.

The third lens L13 is a biconvex lens with positive refractive power and made of glass material, wherein the object side surface S16 is a convex surface, the image side surface S17 is a convex surface, and both of the object side surface S16 and image side surface S17 are aspheric surfaces.

The fourth lens L14 is a meniscus lens with negative refractive power and made of glass material, wherein the object side surface S18 is a concave surface, the image side surface S19 is a convex surface, and both of the object side surface S18 and image side surface S19 are spherical surfaces.

The fifth lens L15 is a biconvex lens with positive refractive power and made of glass material, wherein the object side surface S110 is a convex surface, the image side surface S111 is a convex surface, and both of the object side surface S110 and image side surface S111 are spherical surfaces.

The sixth lens L16 is a meniscus lens with negative refractive power and made of glass material, wherein the object side surface S111 is a concave surface, the image side surface S112 is a convex surface, the object side surface S111 is a spherical surface, and the image side surface S112 is an aspheric surface.

The fifth lens L15 and the sixth lens L16 are cemented.

The seventh lens L17 is a meniscus lens with positive refractive power and made of glass material, wherein the object side surface S113 is a convex surface, the image side surface S114 is a concave surface, and both of the object side surface S113 and image side surface S114 are aspheric surfaces.

Both of the object side surface S115 and image side surface S116 of the optical filter OF1 are plane surfaces.

Both of the object side surface S117 and image side surface S118 of the cover glass CG1 are plane surfaces.

In order to maintain excellent optical performance of the lens assembly in accordance with the first embodiment of the invention, the lens assembly 1 satisfies at least one of the following conditions:

$$0 \text{ mm}^2 < fl_1 \times fl_6 < 215 \text{ mm}^2 \quad (1)$$

$$20 \text{ mm}^2 < fl_3 \times fl_5 < 30 \text{ mm}^2 \quad (2)$$

$$-95 \text{ mm}^2 < fl_5 \times fl_6 < 0 \text{ mm}^2 \quad (3)$$

$$-45 \text{ mm} < fl_1 + fl_6 < 0 \text{ mm} \quad (4)$$

$$-15.5 \text{ mm} < fl_6 - fl_4 < -9.1 \text{ mm} \quad (5)$$

$$34 < Vd_{15} - Vd_{16} < 66 \quad (6)$$

$$2.5 < Vd_{15}/Vd_{16} < 4.5 \quad (7)$$

wherein $fl_1$ is an effective focal length of the first lens L11, $fl_3$ is an effective focal length of the third lens L13, $fl_4$ is an effective focal length of the fourth lens L14, $fl_5$ is an effective focal length of the fifth lens L15, $fl_6$ is an effective focal length of the sixth lens L16, $Vd_{15}$ is an Abbe number of the fifth lens L15, and $Vd_{16}$ is an Abbe number of the sixth lens L16.

By the above design of the lenses, stop ST1, and satisfies at least one of the conditions (1)-(7), the lens assembly 1 is provided with an effective shortened total lens length, an effective corrected aberration, an effective increased resolution, and a resistance to environment temperature variation.

If the value $fl_5 \times fl_6$ of condition (3) is greater than 0 mm² then the ability of correcting the aberration is not good. Therefore, the value $fl_5 \times fl_6$ must be at least less than 0 mm². An optimal range for $fl_5 \times fl_6$ is between −95 mm² and 0 mm². The lens assembly 1 has best corrected aberration and helps to reduce sensitivity when satisfies the condition: $-95 \text{ mm}^2 < fl_5 \times fl_6 < 0 \text{ mm}^2$.

In order to achieve the above purposes and effectively enhance the optical performance, the lens assembly 1 in accordance with the first embodiment of the invention is provided with the optical specifications shown in Table 1, which include the effective focal length, F-number, total lens length, field of view, radius of curvature of each lens surface, thickness between adjacent surface, refractive index of each lens, and Abbe number of each lens. Table 1 shows that the effective focal length is equal to 5.588 mm, F-number is equal to 2.0, total lens length is equal to 18.0 mm, and field of view is equal to 84.6 degrees for the lens assembly 1 of the first embodiment of the invention.

TABLE 1

Effective Focal Length = 5.588 mm
Total Lens Length = 18.0 mm

F-number = 2.0
Field of View = 84.6 Degrees

| Surface Number | Radius of Curvature (mm) | Thickness (mm) | Nd | Vd | Remark |
|---|---|---|---|---|---|
| S11 | 3.889 | 2.17 | 1.590 | 67.700 | The First Lens L11 |
| S12 | 1.924 | 1.97 | | | |
| S13 | −11.975 | 2.32 | 2.010 | 21.000 | The Second Lens L12 |
| S14 | −8.323 | 0.20 | | | |
| S15 | ∞ | −0.03 | | | Stop ST1 |
| S16 | 8.642 | 1.35 | 1.690 | 53.200 | The Third Lens L13 |
| S17 | −5.749 | 0.84 | | | |
| S18 | −2.829 | 1.37 | 2.010 | 21.000 | The Fourth Lens L14 |
| S19 | −7.368 | 0.05 | | | |
| S110 | 8.725 | 2.01 | 1.600 | 67.700 | The Fifth Lens L15 |
| S111 | −3.930 | 0.55 | 2.010 | 21.000 | The Sixth Lens L16 |
| S112 | −5.241 | 1.43 | | | |
| S113 | 2.990 | 1.00 | 1.900 | 31.000 | The Seventh Lens L17 |
| S114 | 2.930 | 1.10 | | | |
| S115 | ∞ | 0.21 | 1.517 | 64.167 | Optical Filter OF1 |
| S116 | ∞ | 0.02 | | | |
| S117 | ∞ | 0.50 | 1.517 | 64.167 | Cover Glass CG1 |
| S118 | ∞ | 0.92 | | | |

The aspheric surface sag z of each lens in table 1 can be calculated by the following formula:

$$z = ch^2/\{1+[1-(k+1)c^2h^2]^{1/2}\}+Ah^4+Bh^6+Ch^8+Dh^{10}+Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each surface are shown in Table 2.

TABLE 2

| Surface Number | k | A | B | C | D | E |
|---|---|---|---|---|---|---|
| S11 | −0.433 | 6.69E−04 | 7.40E−05 | −2.60E−06 | 1.15E−07 | 0.00E+00 |
| S12 | −2.450 | 3.70E−02 | −2.81E−03 | 6.58E−04 | −4.95E−05 | 0.00E+00 |
| S13 | 24.903 | −1.78E−03 | 3.68E−05 | 9.86E−05 | 1.06E−05 | 0.00E+00 |
| S14 | 17.925 | 6.31E−04 | 4.67E−03 | −1.19E−03 | 3.62E−04 | 0.00E+00 |
| S16 | −25.718 | −4.37E−03 | 6.83E−03 | −4.28E−03 | 1.48E−03 | −2.19E−04 |
| S17 | 5.962 | −1.12E−02 | 6.94E−04 | −2.37E−04 | 9.77E−05 | −1.37E−05 |
| S110 | 6.785 | −8.71E−03 | 8.97E−04 | −2.12E−04 | 2.80E−05 | −1.42E−06 |

TABLE 2-continued

| Surface Number | k | A | B | C | D | E |
|---|---|---|---|---|---|---|
| S112 | 0.075 | −4.64E−03 | 1.13E−03 | −1.45E−04 | 1.05E−05 | −2.47E−07 |
| S113 | −3.088 | −5.58E−03 | 1.98E−04 | 1.95E−06 | −1.11E−07 | 0.00E+00 |
| S114 | −3.684 | −6.07E−03 | 3.25E−04 | −1.00E−05 | 1.74E−07 | 0.00E+00 |

Table 3 shows the parameters and condition values for conditions (1)-(7). As can be seen from Table 3, the lens assembly 1 of the first embodiment satisfies the conditions (1)-(7).

TABLE 3

| | | | | | |
|---|---|---|---|---|---|
| $fl_1$ | −10.857 mm | $fl_3$ | 5.156 mm | $fl_4$ | −5.329 mm |
| $fl_5$ | 4.825 mm | $fl_6$ | −19.606 mm | $Vdl_5$ | 67.7 |
| $Vdl_6$ | 21.0 | | | | |
| $fl_1 \times fl_6$ | 212.86 mm² | $fl_3 \times fl_5$ | 24.88 mm² | $fl_5 \times fl_6$ | −94.6 mm² |
| $fl_1 + fl_6$ | −30.46 mm | $fl_6 - fl_4$ | −14.28 mm | $Vdl_5 - Vdl_6$ | 46.7 |
| $Vdl_5/Vdl_6$ | 3.22 | | | | |

Figure 2B:
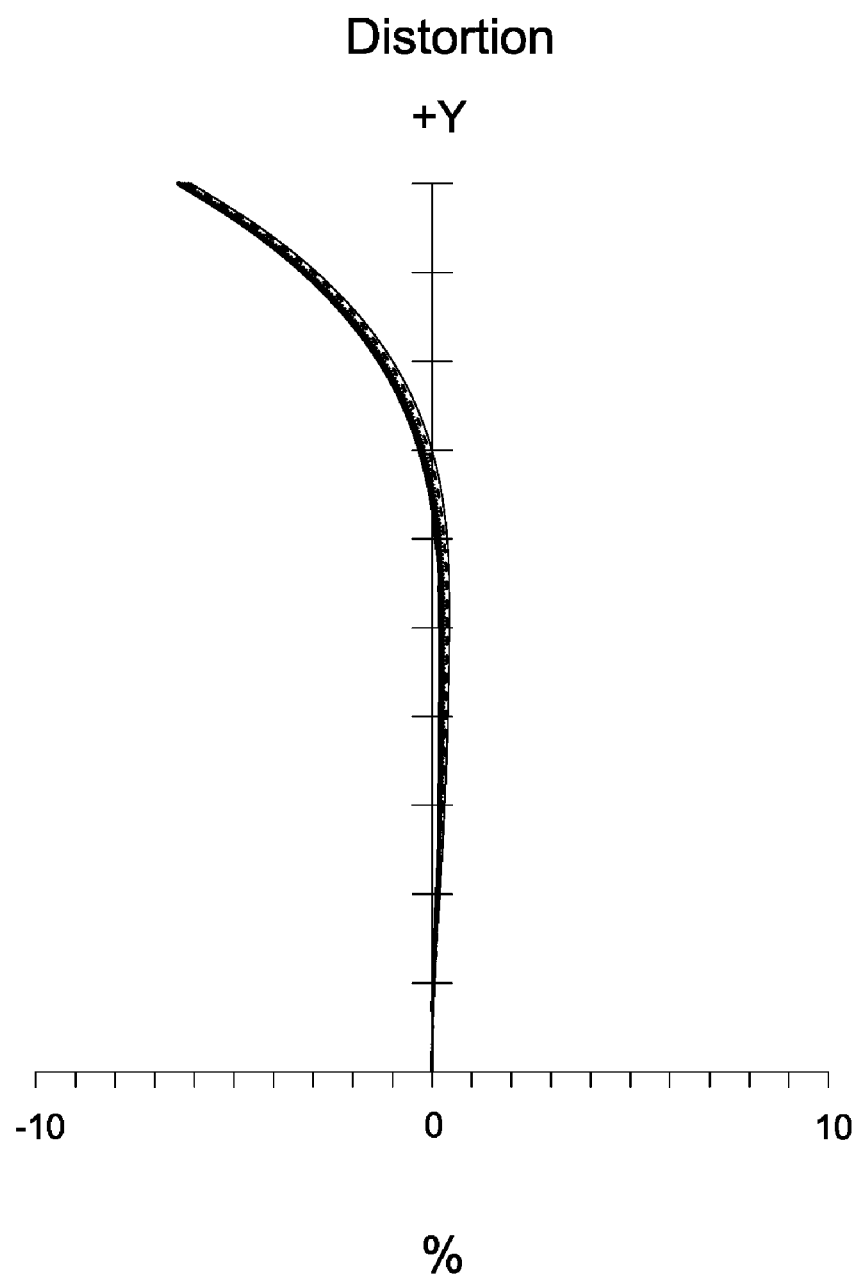
FIG. 2B is a distortion diagram of the lens assembly in accordance with the first embodiment of the invention.
Figure 2C:
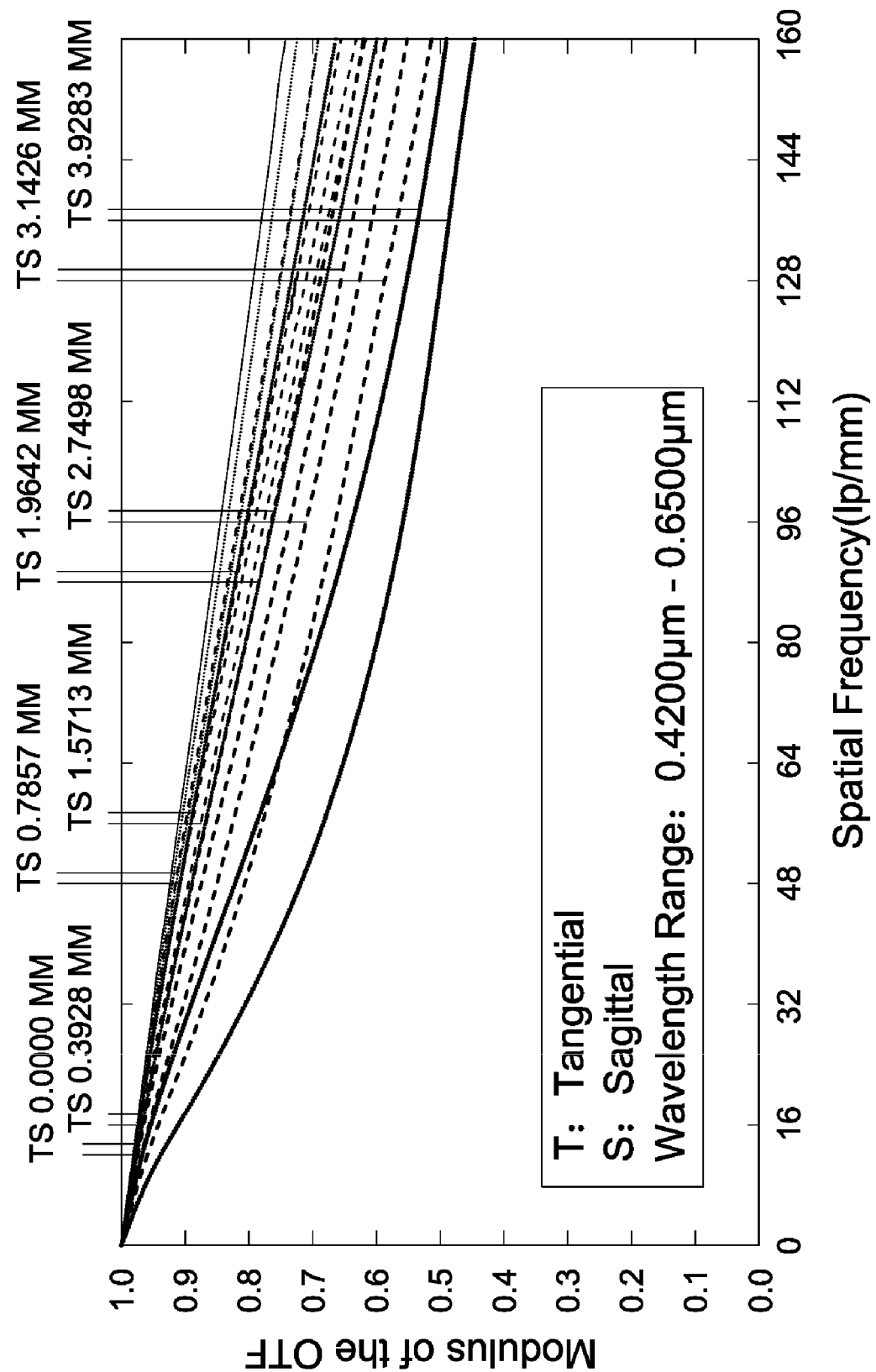
FIG. 2C is a modulation transfer function diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a field curvature diagram of the lens assembly 1 in accordance with the first embodiment of the invention, FIG. 2B shows a distortion diagram of the lens assembly 1 in accordance with the first embodiment of the invention, and FIG. 2C shows a modulation transfer function diagram of the lens assembly 1 in accordance with the first embodiment of the invention.

It can be seen from FIG. 2A that the field curvature of tangential direction and sagittal direction in the lens assembly 1 of the first embodiment ranges from −0.08 mm to 0.02 mm for the wavelength of 0.420 μm, 0.460 μm, 0.510 μm, 0.550 μm, 0.610 μm, and 0.650 μm.

It can be seen from FIG. 2B (in which the six lines in the figure almost coincide to appear as if a signal line) that the distortion in the lens assembly 1 of the first embodiment ranges from −7% to 0.5% for the wavelength of 0.420 μm, 0.460 μm, 0.510 μm, 0.550 μm, 0.610 μm, and 0.650 μm.

It can be seen from FIG. 2C that the modulation transfer function of tangential direction and sagittal direction in the lens assembly 1 of the first embodiment ranges from 0.46 to 1.0 wherein the wavelength ranges from 0.420 μm to 0.650 μm, the fields respectively are 0.0000 mm, 0.3928 mm, 0.7857 mm, 1.5713 mm, 1.9642 mm, 2.7498 mm, 3.1426 mm, and 3.9238 mm, and the spatial frequency ranges from 0 lp/mm to 160 lp/mm.

It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Figure 3:
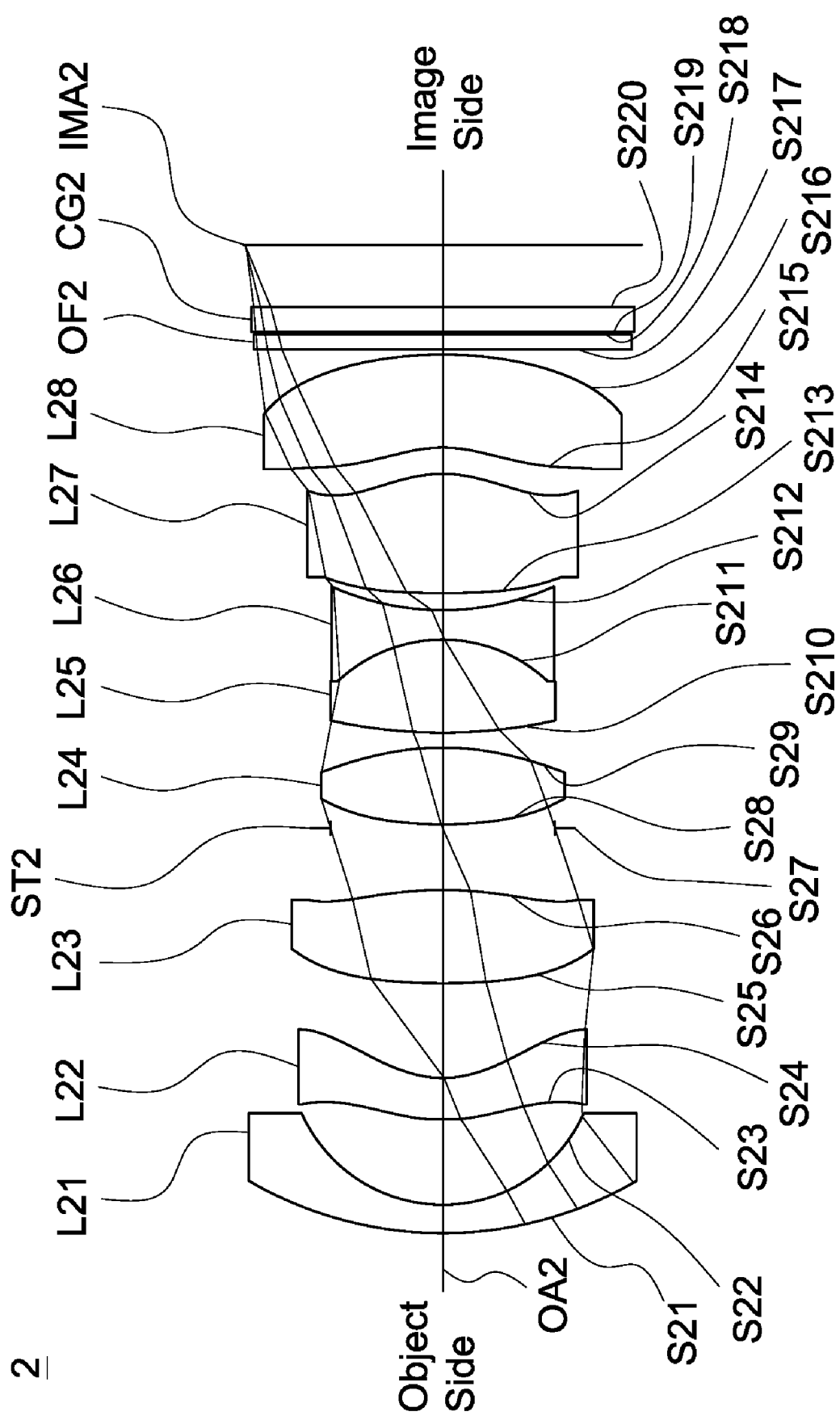
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a first lens L21, a second lens L22, a third lens L23, a stop ST2, a fourth lens L24, a fifth lens L25, a sixth lens L26, a seventh lens L27, an eighth lens L28, an optical filter OF2, and a cover glass CG2, all of which are arranged in order from an object side to an image side along an optical axis OA2. In operation, an image of light rays from the object side is formed at an image plane IMA2.

The first lens L21 is a meniscus lens with negative refractive power and made of glass material, wherein the object side surface S21 is a convex surface, the image side surface S22 is a concave surface, and both of the object side surface S21 and image side surface S22 are spherical surfaces.

The second lens L22 is a meniscus lens with negative refractive power and made of glass material, wherein the object side surface S23 is a convex surface, the image side surface S24 is a concave surface, and both of the object side surface S23 and image side surface S24 are aspheric surfaces.

The third lens L23 is a biconvex lens with positive refractive power and made of glass material, wherein the object side surface S25 is a convex surface, the image side surface S26 is a convex surface, and both of the object side surface S25 and image side surface S26 are aspheric surfaces.

The fourth lens L24 is a biconvex lens with positive refractive power and made of glass material, wherein the object side surface S28 is a convex surface, the image side surface S29 is a convex surface, and both of the object side surface S28 and image side surface S29 are aspheric surfaces.

The fifth lens L25 is a biconvex lens with positive refractive power and made of glass material, wherein the object side surface S210 is a convex surface, the image side surface S211 is a convex surface, and both of the object side surface S210 and image side surface S211 are spherical surfaces.

The sixth lens L26 is a biconcave lens with negative refractive power and made of glass material, wherein the object side surface S211 is a concave surface, the image side surface S212 is a concave surface, and both of the object side surface S211 and image side surface S212 are spherical surfaces.

The fifth lens L25 and the sixth lens L26 are cemented.

The seventh lens L27 is a biconvex lens with positive refractive power and made of glass material, wherein the object side surface S213 is a convex surface, the image side surface S214 is a convex surface, and both of the object side surface S213 and image side surface S214 are aspheric surfaces.

The eighth lens L28 is a meniscus lens with negative refractive power and made of glass material, wherein the object side surface S215 is a concave surface, the image side surface S216 is a convex surface, and both of the object side surface S215 and image side surface S216 are aspheric surfaces.

Both of the object side surface S217 and image side surface S218 of the optical filter OF2 are plane surfaces.

Both of the object side surface S219 and image side surface S220 of the cover glass CG2 are plane surfaces.

In order to maintain excellent optical performance of the lens assembly in accordance with the second embodiment of the invention, the lens assembly 2 satisfies at least one of the following conditions:

$$0 \text{ mm}^2 < f2_1 \times f2_6 < 215 \text{ mm}^2 \quad (8)$$

$$20 \text{ mm}^2 < f2_3 \times f2_5 < 30 \text{ mm}^2 \quad (9)$$

$$-95 \text{ mm}^2 < f2_5 \times f2_6 < 0 \text{ mm}^2 \quad (10)$$

$$-45 \text{ mm} < f2_1 + f2_6 < 0 \text{ mm} \quad (11)$$

$$-15.5 \text{ mm} < f2_6 - f2_4 < -9.1 \text{ mm} \quad (12)$$

$$34 < Vd2_5 - Vd2_6 < 66 \quad (13)$$

$$2.5 < Vd2_5 / Vd2_6 < 4.5 \quad (14)$$

The definition of $f2_1$, $f2_3$, $f2_4$, $f2_5$, $f2_6$, $Vd2_5$, and $Vd2_6$ are the same as that of $f1_1$, $f1_3$, $f1_4$, $f1_5$, $f1_6$, $Vd1_5$, and $Vd1_6$ in the first embodiment, and is not described here again.

By the above design of the lenses, stop ST2, and satisfies at least one of the conditions (8)-(14), the lens assembly 2 is provided with an effective shortened total lens length, an effective corrected aberration, an effective increased resolution, and a resistance to environment temperature variation.

If the value $Vd2_5 - Vd2_6$ of condition (13) is less than 34 then the achromatic ability for the lens assembly 2 is not good. Therefore, the value $Vd2_5 - Vd2_6$ must be at least greater than 34. An optimal range for $Vd2_5 - Vd2_6$ is between 34 and 66. The lens assembly 2 has best achromatic condition when satisfies the condition: $34 < Vd2_5 - Vd2_6 < 66$.

In order to achieve the above purposes and effectively enhance the optical performance, the lens assembly 2 in accordance with the second embodiment of the invention is provided with the optical specifications shown in Table 4, which include the effective focal length, F-number, total lens length, field of view, radius of curvature of each lens surface, thickness between adjacent surface, refractive index of each lens, and Abbe number of each lens. Table 4 shows that the effective focal length is equal to 4.294 mm, F-number is equal to 2.0, total lens length is equal to 18.725 mm, and field of view is equal to 86 degrees for the lens assembly 2 of the second embodiment of the invention.

TABLE 4

| Effective Focal Length = 4.294 mm Total Lens Length = 18.725 mm | | | F-number = 2.0 | | |
|---|---|---|---|---|---|
| Surface Number | Radius of Curvature (mm) | Thickness (mm) | Field of View = 86 Degrees | | |
| | | | Nd | Vd | Remark |
| S21 | 7.727 | 0.58 | 1.950 | 18.000 | The First Lens L21 |
| S22 | 3.095 | 1.69 | | | |
| S23 | 3.642 | 0.83 | 1.600 | 67.700 | The Second Lens L22 |
| S24 | 2.087 | 1.89 | | | |
| S25 | 13.196 | 1.87 | 1.93 | 27.900 | The Third Lens L23 |
| S26 | −7.114 | 1.23 | | | |
| S27 | ∞ | 0.08 | | | Stop ST2 |
| S28 | 8.903 | 1.53 | 1.490 | 70.200 | The Fourth Lens L24 |
| S29 | −5.502 | 0.30 | | | |
| S210 | 10.580 | 1.86 | 1.500 | 81.500 | The Fifth Lens L25 |
| S211 | −3.068 | 0.59 | 1.920 | 20.900 | The Sixth Lens L26 |
| S212 | 5.494 | 0.34 | | | |
| S213 | 18.043 | 2.38 | 1.700 | 55.500 | The Seventh Lens L27 |
| S214 | −2.560 | 0.53 | | | |
| S215 | −2.573 | 1.86 | 1.590 | 61.200 | The Eighth Lens L28 |
| S216 | −7.552 | 0.10 | | | |
| S217 | ∞ | 0.30 | 1.517 | 64.167 | Optical Filter OF2 |
| S218 | ∞ | 0.05 | | | |
| S219 | ∞ | 0.50 | 1.517 | 64.167 | Cover Glass CG2 |
| S220 | ∞ | 1.23 | | | |

The aspheric surface sag z of each lens in table 4 can be calculated by the following formula:

$$z = ch^2 / \{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 5.

TABLE 5

| Surface Number | k | A | B | C | D | E | F | G |
|---|---|---|---|---|---|---|---|---|
| S23 | −1.464 | −1.30E−02 | 1.27E−04 | 1.06E−05 | 0.00E+00 | 0.00E+00 | 0.00E+00 | 0.00E+00 |
| S24 | −0.930 | −1.73E−02 | 2.94E−04 | −1.20E−05 | 0.00E+00 | 0.00E+00 | 0.00E+00 | 0.00E+00 |
| S25 | 12.831 | 1.28E−03 | 3.13E−04 | −1.54E−05 | 0.00E+00 | 0.00E+00 | 0.00E+00 | 0.00E+00 |

TABLE 5-continued

| Surface Number | k | A | B | C | D | E | F | G |
|---|---|---|---|---|---|---|---|---|
| S26 | −4.356 | 1.93E−03 | 2.03E−04 | 2.79E−05 | 0.00E+00 | 0.00E+00 | 0.00E+00 | 0.00E+00 |
| S28 | 5.214 | 4.15E−03 | −5.11E−05 | −6.43E−06 | 0.00E+00 | 0.00E+00 | 0.00E+00 | 0.00E+00 |
| S29 | −0.405 | 1.61E−03 | 3.12E−05 | −2.62E−06 | 0.00E+00 | 0.00E+00 | 0.00E+00 | 0.00E+00 |
| S213 | 34.797 | 2.57E−03 | 1.59E−03 | −3.77E−04 | 3.01E−05 | −1.00E−06 | 0.00E+00 | 0.00E+00 |
| S214 | −4.537 | 2.86E−03 | 1.56E−03 | 1.31E−04 | −4.90E−04 | 2.85E−06 | 0.00E+00 | 0.00E+00 |
| S215 | −7.114 | 7.73E−03 | 9.59E−04 | −3.40E−04 | 4.19E−05 | 5.35E−08 | 2.18E−0-9 | 0.00E+00 |
| S216 | 0.853 | 2.81E−03 | −8.95E−04 | 1.17E−04 | −8.88E−06 | 2.69E−07 | 1.71E−09 | −2.65E−10 |

Table 6 shows the parameters and condition values for conditions (8)-(14). As can be seen from Table 6, the lens assembly 2 of the second embodiment satisfies the conditions (8)-(14).

TABLE 6

| $f2_1$ | −5.744 mm | $f2_3$ | 5.148 mm | $f2_4$ | 7.206 mm |
|---|---|---|---|---|---|
| $f2_5$ | 4.999 mm | $f2_6$ | −2.044 mm | $Vd2_5$ | 81.5 |
| $Vd2_6$ | 20.9 | | | | |
| $f2_1 \times f2_6$ | 11.74 mm² | $f2_3 \times f2_5$ | 25.73 mm² | $f2_5 \times f2_6$ | −10.218 mm² |
| $f2_1 + f2_6$ | 7.788 mm | $f2_6 - f2_4$ | −9.25 mm | $Vd2_5 - Vd2_6$ | 60.6 |
| $Vd2_5/Vd2_6$ | 3.90 | | | | |

Figure 4A:
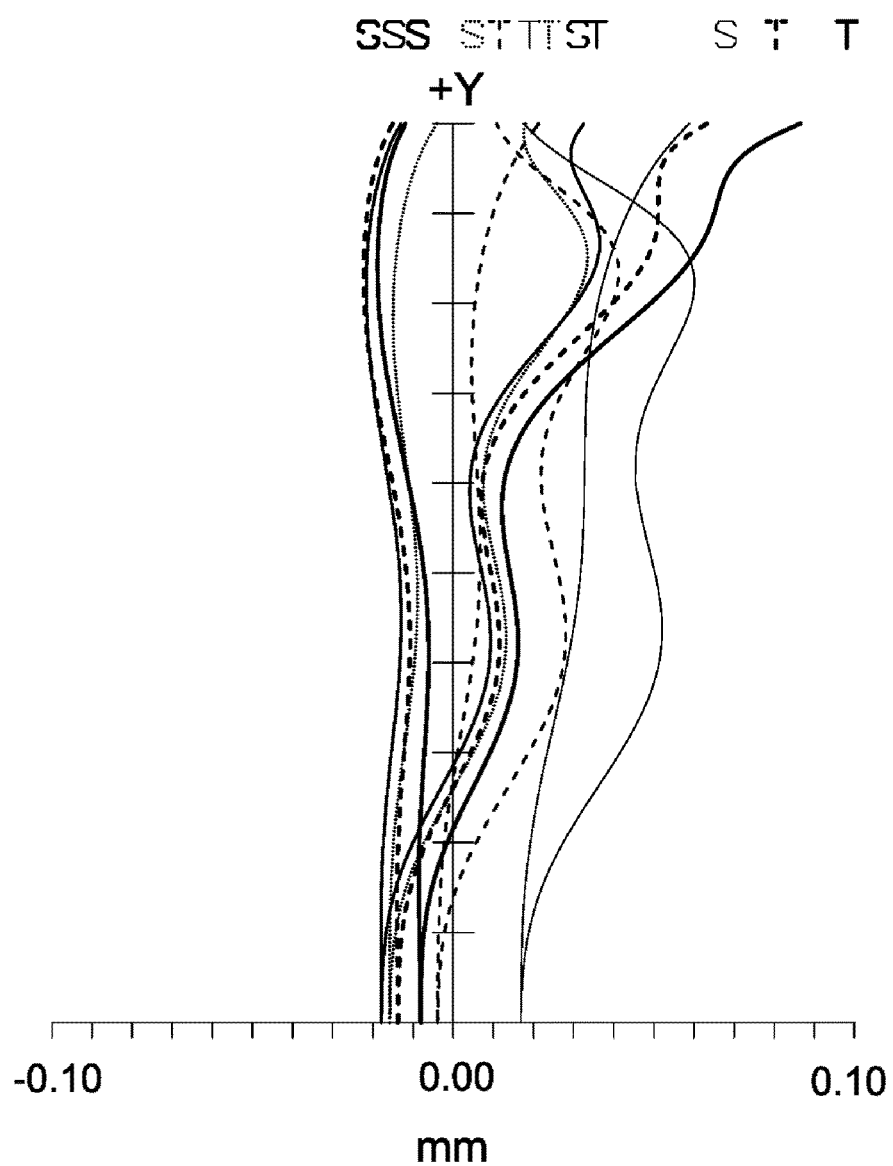
FIG. 4A depicts a field curvature diagram of the lens assembly in accordance with the second embodiment of the invention.
Figure 4B:
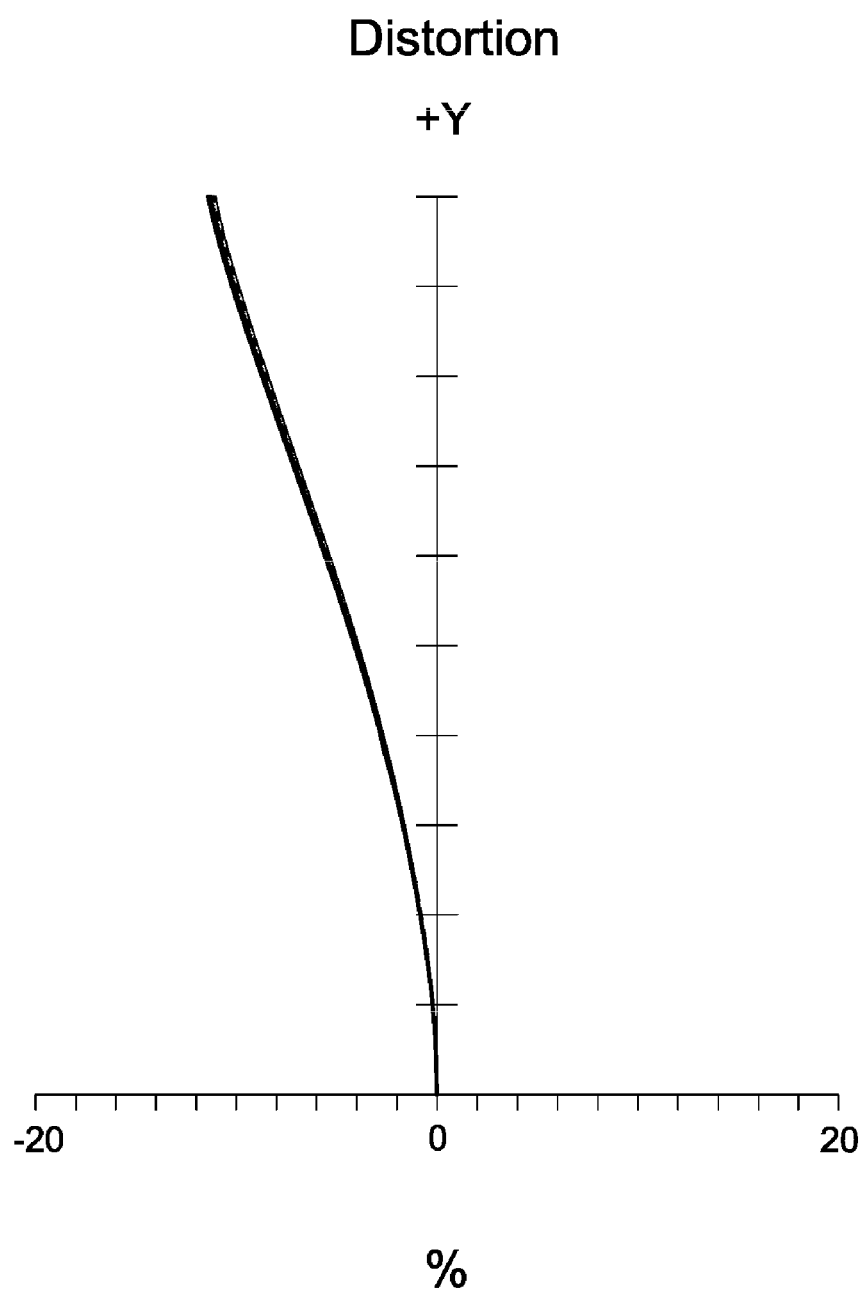
FIG. 4B is a distortion diagram of the lens assembly in accordance with the second embodiment of the invention.
Figure 4C:
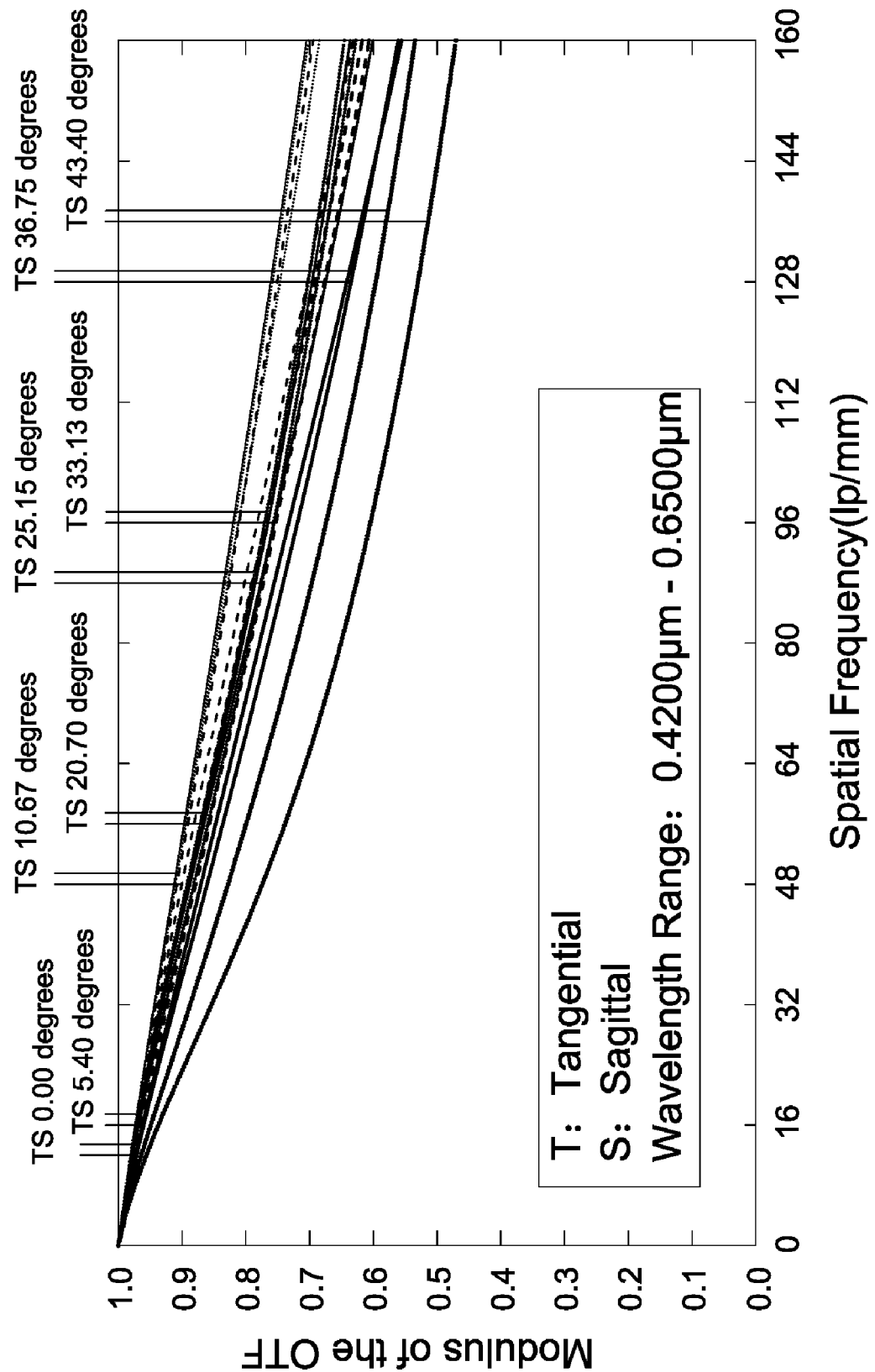
FIG. 4C is a modulation transfer function diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a field curvature diagram of the lens assembly 2 in accordance with the second embodiment of the invention, FIG. 4B shows a distortion diagram of the lens assembly 2 in accordance with the second embodiment of the invention, and FIG. 4C shows a modulation transfer function diagram of the lens assembly 2 in accordance with the second embodiment of the invention.

It can be seen from FIG. 4A that the field curvature of tangential direction and sagittal direction in the lens assembly 2 of the second embodiment ranges from −0.025 mm to 0.09 mm for the wavelength of 0.420 μm, 0.460 μm, 0.510 μm, 0.550 μm, 0.610 μm, and 0.650 μm.

It can be seen from FIG. 4B (in which the six lines in the figure almost coincide to appear as if a signal line) that the distortion in the lens assembly 2 of the second embodiment ranges from −11% to 0% for the wavelength of 0.420 μm, 0.460 μm, 0.510 μm, 0.550 μm, 0.610 μm, and 0.650 μm.

It can be seen from FIG. 4C that the modulation transfer function of tangential direction and sagittal direction in the lens assembly 2 of the second embodiment ranges from 0.47 to 1.0 wherein the wavelength ranges from 0.420 μm to 0.650 μm, the fields respectively are 0.00 degree, 5.40 degrees, 10.67 degrees, 20.70 degrees, 25.15 degrees, 33.13 degrees, 36.75 degrees, and 43.40 degrees, and the spatial frequency ranges from 0 lp/mm to 160 lp/mm.

It is obvious that the field curvature and the distortion of the lens assembly 2 of the second embodiment can be corrected effectively, and the resolution of the lens assembly 2 of the second embodiment can meet the requirement. Therefore, the lens assembly 2 of the second embodiment is capable of good optical performance.

The main conditions for the present invention are −95 mm² < $f_5 \times f_6$ < 0 mm² and 34 < $Vd_5 - Vd_6$ < 66. The condition values of the embodiments for the present invention also fall within the range of the remaining conditions. The condition: −95 mm² < $f_5 \times f_6$ < 0 mm² benefits to overall aberration correction. The condition: 34 < $Vd_5 - Vd_6$ < 66 benefits to a better achromatic ability.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, in sequence from an object side to an image side along an optical axis, comprising:
    a first lens which is with negative refractive power and comprises a convex surface facing the object side and a concave surface facing the image side;
    a second lens which is with refractive power;
    a third lens which is a biconvex lens with positive refractive power;
    a fourth lens which is with refractive power and comprises a convex surface facing the image side;
    a fifth lens which is a biconvex lens with positive refractive power;
    a sixth lens which is with negative refractive power and comprises a concave surface facing the object side; and
    a seventh lens which is a meniscus lens with refractive power;
    wherein the lens assembly satisfies the following condition:

20 mm² < $f_3 \times f_5$ < 30 mm², wherein $f_3$ is an effective focal length of the third lens and $f_5$ is an effective focal length of the fifth lens.

2. The lens assembly as claimed in claim 1, wherein the lens assembly satisfies the following condition:

34 < $Vd_5 - Vd_6$ < 66, wherein $Vd_5$ is an Abbe number of the fifth lens and $Vd_6$ is an Abbe number of the sixth lens.

3. The lens assembly as claimed in claim 1, wherein the seventh lens is with positive refractive power.

4. The lens assembly as claimed in claim 3, wherein the seventh lens further comprises a concave surface facing the image side.

5. The lens assembly as claimed in claim 4, wherein the fourth lens is with negative refractive power and further comprises a concave surface facing the object side.

6. The lens assembly as claimed in claim 5, wherein the second lens is with positive refractive power and further comprises a concave surface facing the object side and a convex surface facing the image side.

7. The lens assembly as claimed in claim 2, wherein the seventh lens further comprises a concave surface facing the object side.

8. The lens assembly as claimed in claim 7, wherein the fourth lens is with positive refractive power and further comprises a convex surface facing the object side.

9. The lens assembly as claimed in claim 8, wherein the second lens is with negative refractive power and further comprises a convex surface facing the object side and a concave surface facing the image side.

10. The lens assembly as claimed in claim 1, further comprising an eighth lens disposed between the fifth lens and the image side.

11. The lens assembly as claimed in claim 10, wherein the eighth lens is with positive refractive power and comprises a convex surface facing the object side and a convex surface facing the image side.

12. The lens assembly as claimed in claim 1, wherein the lens assembly satisfies:

$0\ mm^2 < f_1 \times f_6 < 215\ mm^2$, wherein $f_1$ is an effective focal length of the first lens and $f_6$ is an effective focal length of the sixth lens.

13. The lens assembly as claimed in claim 12, wherein the lens assembly satisfies:

$-45\ mm < f_1 + f_6 < 0\ mm$, wherein $f_1$ is an effective focal length of the first lens and $f_6$ is an effective focal length of the sixth lens.

14. The lens assembly as claimed in claim 1, wherein the lens assembly satisfies:

$-95\ mm^2 < f_5 \times f_6 < 0\ mm^2$, wherein $f_5$ is an effective focal length of the fifth lens and $f_6$ is an effective focal length of the sixth lens.

15. The lens assembly as claimed in claim 1, wherein the lens assembly satisfies:

$-15.5\ mm < f_6 - f_4 < -9.1\ mm$, wherein $f_4$ is an effective focal length of the fourth lens and $f_6$ is an effective focal length of the sixth lens.

16. The lens assembly as claimed in claim 1, wherein the lens assembly satisfies:

$2.5 < Vd_5/Vd_6 < 4.5$, wherein $Vd_5$ is an Abbe number of the fifth lens and $Vd_6$ is an Abbe number of the sixth lens.

17. The lens assembly as claimed in claim 1, further comprising a stop disposed between the second lens and the fourth lens.

18. The lens assembly as claimed in claim 1, wherein the fifth lens and the sixth lens are cemented.

\* \* \* \* \*